United States Patent Office 3,362,871
Patented Jan. 9, 1968

3,362,871
NOVEL INSECTICIDAL CARBAMATE-PROPARGYLARYL ETHER COMPOSITIONS
Josef Fellig, Glen Rock, and Albert Israel Rachlin, Verona, N.J., assignors to Hoffmann-La Roche Inc., Nutley, N.J., a corporation of New Jersey
No Drawing. Filed Sept. 10, 1965, Ser. No. 486,545
27 Claims. (Cl. 167—31)

ABSTRACT OF THE DISCLOSURE

Synergistic insecticidal compositions are provided by a combination of an insecticidal carbamate, e.g. 1-naphthyl-N-methyl carbamate and a propargylaryl ether, e.g. a trihalophenyl-2-propynyl ether.

This invention relates to new compositions of matter and to processes of using such compositions. More particularly, the invention relates to synergistic insecticidal compositions and their use.

In its broad composition aspect the invention comprises compositions consisting essentially of a carbamate insecticide and a propargyl argyl ether. In its broad process aspect the invention comprises a method of killing insects by contacting them with the aforesaid compositions.

Propargyl aryl ethers suitable for use in the practice of this invention can be represented by the formula

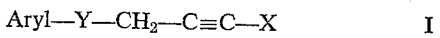

Aryl—Y—CH$_2$—C≡C—X       I wherein the symbol Y represents oxygen or sulfur; X represents hydrogen or halogen, i.e., chlorine, bromine, iodine and fluorine.

The aryl moiety of the propargyl aryl ethers suitable for the practice of this invention can be any unsubstituted aromatic hydrocarbon such as phenyl, naphthyl, dihydronaphthyl, tetralin, anthryl, phenanthryl, indenyl, fluorenyl, or such aromatic hydrocarbons bearing one or more substituents which can be halo, lower alkyl, lower alkoxy, aryl, aryloxy, aralkyl, aralkoxy, nitro, cyano, carboxyl, carboalkoxy, acylamino or lower alkylimido.

The terms "halo" and "halogen" as used throughout this specification denote any of the four halogens, viz, chlorine, bromine, iodine and fluorine. The term "lower alkyl" denotes straight or branched chain hydrocarbons containing 1 to 7 carbon atoms, e.g., methyl, ethyl, propyl, isopropyl and the like. The term "lower alkoxy" denotes a lower alkyl group as defined above which is joined to the molecule through an ether linkage. The term "aryl" denotes carbocyclic hydrocarbons having at least one aromatic ring such as phenyl, naphthyl, dihydronaphthyl and the like and such aromatic hydrocarbons in which one or more of the hydrogens has been replaced by a functional group indicated above. The term "aryloxy" denotes aryl radicals as defined above which are joined to the molecule through an ether linkage. The term "ar-alkyl" denotes lower alkyl groups in which an aryl group as defined above is substituted for a hydrogen atom, e.g., benzyl, phenethyl and the like. The term "ar-alkoxy" denotes ar-alkyl groups joined to the molecule through an ether linkage. The term "acylamino" denotes an amino group in which one of the hydrogens of the amino group has been replaced by an organic acid residue such as, for example, lower alkanoyl, e.g., acetyl, etc.; aroyl, e.g., benzoyl, etc. Exemplary acrylamino groups answering this description are acetylamino and benzoylamino.

As has been indicated, the compounds encompassed by Formula I above include both the propargyl aryl ethers and the propargyl aryl thioethers. Exemplary compounds answering to the above description are the phenylpropargyl ethers, e.g., phenyl 2-propynyl ether, phenyl 2-propynyl thioether, phenyl 3-iodo-2-propynyl ether; the halophenyl propargyl ethers and halophenyl propargyl thioethers, e.g., 2,3-dichlorophenyl 2-propynyl ether, 2,3-dichlorophenyl 3-iodo-2-propynyl ether, 2,3-dibromophenyl 2-propynyl ether, 2,4-dichlorophenyl 2-propynyl ether, 2,5-dichlorophenyl-2-propynyl ether, 2,3,6-trichlorophenyl 2-propynyl ether, 2,3,6-trichlorophenyl 3-iodo-2-propynyl ether, 2,3,4-trichlorophenyl-2-propynyl ether, 3,4,5-trichlorophenyl 2-propynyl ether, 2,3-dichlorophenyl 2- propynyl thioether, 2,3-dichloro-1-(3-iodo-2-propynylmercapto)benzene, etc.; alkoxy substituted-phenyl propargyl ethers, e.g., 4-methoxyphenyl 2-propynyl ether, 2,6-dimethoxyphenyl 2-propynyl ether, etc.; nitrophenyl propargyl ethers, e.g., 3-nitrophenyl-2-propynyl ether, 3-nitrophenyl 3-iodo-2-propynyl ether, 2-nitrophenyl 2-propynyl ether, etc.; substituted-phenyl propargyl ethers having mixed substituents such as 2-nitro-4-chlorophenyl 2-propynyl ether, 4 - chloro - 6 - iodo-2-nitrophenyl 2-propynyl ether, 4-chloro - 6 - iodo-2-nitrophenyl 3-iodo-2-propynyl ether, etc.; the naphthyl propargyl ethers, e.g., 1-naphthyl-2 - propynyl ether, 2,4 - dichloro - 1 - naphthyl-2-propynyl ether, 2,4-dichloro - 1 - naphthyl-3-iodo-2-propynyl ether, etc.

The phenyl and substituted phenyl propargyl ethers represented by the formula

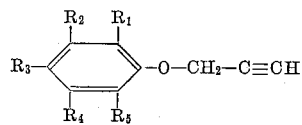

II wherein each of R$_1$ to R$_5$ is either hydrogen, halogen, lower alkyl, lower alkoxy or nitro constitute a preferred group. Especially preferred are the dihalo, trihalo and mono-nitrophenyl propargyl ethers and of these 2,4-dichlorophenylpropargyl ether and the trichlorophenylpropargyl ethers are considered optimum in terms of activity and availability.

As the carbamate portion of the synergistic composition of this invention there can be used any of the insecticidal carbamates. The term "insecticidal carbamate" is well known to those skilled in the art and encompasses a variety of carbocyclic and heterocyclic carbamates such as, for example, aryl carbamates, e.g., phenyl carbamates;

phenyl N-alkyl carbamates, i.e., phenyl N-methyl carbamate and the like; phenyl N,N - dialkyl carbamates, i.e., phenyl N,N-dimethyl carbamate and the like; substituted phenyl carbamates, e.g., o-chlorophenyl N-methyl carbamate, p-fluorophenyl N-methyl carbamate, m-bromophenyl N-methyl carbamate, p-acetylphenyl N-methyl carbamate; alkylphenyl N-methyl carbamates, e.g., m-methylphenyl N-methyl carbamate, p-ethylphenyl N-methyl carbamate, o-cyclohexylphenyl N-methyl carbamate, o-iodophenyl N-methyl carbamate, 2,3-dimethyl-4-chlorophenyl N-methyl carbamate, 2,4,6-trichloro-3,5-dimethylphenyl N-methyl carbamate, etc.; naphthyl carbamates, e.g., 1-naphthyl N-alkyl carbamates, 2-naphthyl N-alkyl carbamates, 1-naphthyl N,N-dialkyl carbamates, etc.; substituted naphthyl carbamates, e.g., 2,4-dichloro-1-naphthyl carbamate, 2,4-dichloro-1-naphthyl N-methyl carbamate, etc.; other carbocyclic carbamates such as hydrogenated 1-naphthyl N-methyl carbamates, e.g., 1-(5,6-dihydronaphthyl) N-methyl carbamate, etc.; indanyl carbamates, e.g., 4-indanylalkyl carbamates, 4-indanyl N,N-dialkyl carbamates; heterocyclic carbamates such as pyrazolyl carbamates, e.g., 1-phenyl-3-methylpyrazolyl N,N-dimethyl carbamate, 1-isopropyl-3-methylpyrazolyl N,N-dimethyl carbamate and the like; dithiolaneoximino carbamates, e.g., 2-methylimino-1,3-dithiolane, 2-oximino-1,4 - dithiolane, 2-oximino-1,3-oxathiolane, 2-methylcarbamoyloximino-1,3-dithiolane, 2-oximino-5-dithiolane and the like.

Insecticidal carbamates which are especially well suited for the synergistic compositions of this invention are the lower alkylphenyl methyl carbamates, e.g., 3-sec-butylphenyl methyl carbamate, 3-tert-butylphenyl methyl carbamate, 2-tert-butylphenyl methyl carbamate, 3-isopropylphenyl methyl carbamate, 3-methyl-5-isopropylphenyl N-methyl carbamate, etc.; the lower alkoxy-phenyl methyl carbamates, e.g., 2-isopropoxyphenyl methyl carbamate, o-sec-butoxyphenyl methyl carbamate, 2-isopropoxy-5-methylphenyl methyl carbamate, o-cyclopentoxyphenyl methyl carbamate, etc.; the aminophenyl methyl carbamates, e.g., 3,5-dimethyl-4-dimethylaminophenyl methyl carbamate, 3-methyl-4-(N,N-dimethylamino)phenyl methyl carbamate, 2-dialkylaminophenyl methyl carbamate, mate, 2-lower alkyl-3-(N-alkylamino)phenyl methyl carbamate, 2-lower alkyl-3-(N,N-dialkylamino)phenyl methyl carbamate, 2-dialkylaminophenyl methyl carbamate, etc.; the substituted phenyl methyl carbamates, e.g., 4-thiocyanophenyl methyl carbamate, 3,5-dimethyl-4-alkylthiophenyl methyl carbamate, 3,4-dimethyl-6-chlorophenyl methyl carbamate, etc.; carbocyclic carbamates, e.g., 5,5-dimethyl-3-oxo-1-cyclohexen-1-yl methyl carbamate, 3-cyclohexenylmethyl N-methyl carbamate, etc.; the 1-naphthyl methyl carbamates, e.g., 1-naphthyl N-methyl carbamate, 2,4-dichloro-1-naphthyl methyl carbamate, etc. and the heterocyclic carbamates, e.g., 1-isopropyl-3-methyl-5-pyrazolyl dimethyl carbamate, 1-phenyl 3-methyl-5-pyrazolyl dimethyl carbamate, 2-methylcarbamoyloximino-1,3-dithiolane, etc.

It has now been found that use of the carbamate insecticides in combination with a propargylaryl ether provides an insecticide of greatly enhanced activity. There is thus provided a means for obtaining a quantitative as well as a qualitative improvement in the insecticidal properties of the carbamates. The synergistic composition of this invention is capable of achieving faster knockdown and greater lethality resulting in much greater control of insects than has heretofore been obtained by the use of carbamates without synergists or carbamates together with known synergists. One particular advantage of the compositions of this invention is their relative lack of toxicity to warm-blooded animals particularly to mammals.

The following table illustrates the $LD_{50}$ for representative carbamates and propargyl aryl ethers used in the practice of this invention.

TABLE I.—MAMMALIAN TOXICITY

| | $LD_{50}$ (mg./kg./p.o.) |
|---|---|
| 1-naphthyl N-methyl carbamate | 840(m) |
| 1 - naphthyl N-methyl carbamate | 500–700(r) |
| 4 - dimethylamino-3,5-xylylmethyl carbamate | 15–60(r) |
| 1 - isopropyl-3-methyl-5-pyrazolyl dimethyl carbamate | 55(r) |
| 2,3,6-trichlorophenyl 2-propynyl ether | 950(m) |
| 2,3,6-trichlorophenyl 3-iodo-2-propynyl ether | 1250(m) |
| 1-naphthyl N-methyl carbamate and 2,3,6-trichlorophenyl 2-propynyl ether (1:5) | 450(m) |
| 1-naphthyl N-methyl carbamate and 2,3,6-trichlorophenyl 3-iodo-2-propynyl ether (1:5) | 800(m) |

(m) Indicates $LD_{50}$ in mice.
(r) Indicates $LD_{50}$ in rats.

The exact proportions of the two components of the novel compositions of this invention as an insecticidal formulation will vary with the type of use in which the insecticide is employed, the method application, the nature of insect to be controlled and other factors similarly encountered in the insecticidal art. The ratio of carbamate to propargylaryl ether can vary between wide limits. However, practical considerations limit the amount of propargylaryl ether used to about 0.1 to 10 parts by weight per part of carbamate present in the composition.

The total concentration of these ingredients in a final insecticidal composition will vary with the form of application and type of use. The compositions of this invention can be formulated as concentrators or as granules or with carriers as sprays, aerosols or dusts. For some purposes it is preferred that the carriers include emulsions or solutions or organic solvents and ancillary suspending and wetting agents. Solid carriers may also be employed including chalk, talc, bentonite, kaolin, diatomaceous earth, silica, Fuller's earth, lime, gypsum, flours derived from various organic wastes and similar powders. In general, the techniques used in formulating insecticidal compositions of 1-naphthyl N-methyl carbamate described in Farm Chemicals, vol. 128, p. 52 et seq. can also be employed in formulating insecticidal compositions with the synergistic combinations of the present invention.

The compositions may also contain other additives such as emulsifying agents, wetting agents, masking agents, etc. or they can be combined with other known insecticides such as pyrethrins, etc. In these forms the concentrations of active ingredients and the vehicles are adjusted so that flying insects are exposed to lethal amounts of space sprays or aerosols and crawling, chewing and hopping insects are exposed to surfaces that have been coated with lethal amounts of this composition in dusts or in spray form. The compositions of this invention may be concentrates suitable for storage or transport and containing, for example, from about 40 to about 80 percent by weight of the novel synergistic combination. These can be diluted with the same or a different carrier to a concentration suitable for application. In particular, concentrations of about 2 to about 20 percent by weight of the active material based on the total weight of the composition are satisfactory though lower or higher concentrations can be applied depending upon the mode of application.

The synergistic combinations of this invention are operative in destroying insects by any of the usual techniques such as contact, ingestion and the like and can be applied as a single composition or alternatively, the active components can be applied serially in any order at time intervals of up to about 8 hours or longer. They are active against a wide variety of insects. They are active, for example, against Diptera such as houseflies, fruit flies, mosquitoes, stable flies and face flies, etc.; Lepidoptera such as cabbage loopers, spruce budworms, Gypsy moths, corn earworms, armyworms, etc.; and Coleoptera such as alfalfa weevils, flour beetles, etc.

The following tables summarize the results obtained in a series of experiments using direct topical application of various synergistic compositions of this invention. Table II illustrates the activity of representative combinations of insecticidal carbamate and propargylaryl ether against houseflies. A susceptible, stable strain (NAIDM) of houseflies (*Musca domestica*) is maintained in the laboratory under the standard conditions prescribed by the CSMA (see: Soap and Chemical Specialities Blue Book).

The test consists in the topical application to the flies of a known amount of candidate compound in a standard volume of acetone (1 mcl.). Only adult female flies 4–6 days old are used for testing. Three replicates of ten flies each are run for every compound and every concentration.

Testing is carried out in the following manner:

A cage of flies, holding approximately 500 individuals, is briefly exposed to an atmosphere of $CO_2$ in a specially constructed chamber to anesthesize the animals. They are then transferred to several porcelain table-type Buchner funnels through which a slow stream of $CO_2$ is maintained and sorted out by sex, the males being discarded. Ten female flies are placed on a filter paper into the top of a disposable plastic petri dish (diameter 100 mm., height 200 mm.). A cotton wick soaked with reconstituted non-fat powdered milk is placed into the dish to serve as a source of moisture and food. Exactly 1.0 mcl. of an acetone solution of the test compound, as measured by an ISCO micro-spplicator, is applied to the thoracic region of each fly (the micro-applicator, which is available commercially from Instrumentation Specialties Co., Lincoln, Nebraska, is essentially a synchronous motor-driven microsyringe with a timed relay). After application of the test solution, the bottom of the petri dish, into which about 10 small holes had been pierced to allow for air circulation, is placed in position. The assembled petri dishes holding the test insects are then placed in a holding room at 78–80° F. for a period of 24 hours. Knockdown is checked at short time intervals for up to 4 hours following application, mortality is checked at 24 hours at which time the test is terminated. Untreated and acetone-traeted controls are included with all series.

TABLE II

[Synergistic effect of insecticidal compositions containing $x$ MCG. of 1-naphthyl-N-methyl carbamate and $y$ MCG. of a propargylaryl ether applied topically to house flies]

| Propargylaryl ether | Percent Kill | | | | | |
|---|---|---|---|---|---|---|
| | $x=0, y=10$ | $x=10, y=0$ | $x=0.2, y=1.0$ | $x=0.4, y=2.0$ | $x=1.0, y=5.0$ | $x=2.0, y=10.0$ |
| 2,3,6-trichlorophenyl 2-propynyl ether | 0 | 0 | 84 | 100 | | |
| 2,3,6-trichlorophenyl 3-iodo-2-propynyl ether | 0 | 0 | 90 | 100 | | |
| 2,3,4-trichlorophenyl 2-propynyl ether | 0 | 0 | 91 | 100 | | |
| 2,3,4-trichlorophenyl 3-iodo-2-propynyl ether | 0 | 0 | 53 | 100 | | |
| 3,4,5-trichlorophenyl 2-propynyl ether | 0 | 0 | 88 | 100 | | |
| 2,4,5-trichlorophenyl 2-propynyl ether | 0 | 0 | 47 | 97 | | |
| 2,3,5-trichlorophenyl 3-iodo-2-propynyl ether | 0 | 0 | 23 | 97 | | |
| 2,3,4-trichlorophenyl 3-iodo-2-propynyl ether | 0 | 0 | 20 | 97 | | |
| 2,4,6-trichlorophenyl 2-propynyl ether | 0 | 0 | 17 | 93 | | |
| 3,4,5-trichlorophenyl 3-iodo-2-propynyl ether | 0 | 0 | 13 | 97 | | |
| 2,3,5-trichlorophenyl 2-propynyl ether | 0 | 0 | 13 | 87 | | |
| 2,4,6-trichlorophenyl 3-iodo-2-propynyl ether | 0 | 0 | 0 | 53 | | |
| 2,3-dichlorophenyl 3-iodo-2-propynyl ether | 0 | 0 | 13 | 97 | 100 | 100 |
| 2,5-dichlorophenyl 3-iodo-2-propynyl ether | 0 | 0 | 10 | 73 | | |
| 2,3-dichlorophenyl 2-propynyl ether | 0 | 0 | 0 | 0 | 33 | 90 |
| 2,3,4,6-tetrachlorophenyl 3-iodo-2-propynyl ether | 0 | 0 | 10 | 90 | 100 | 100 |
| 2,3,4,5,6-pentachlorophenyl 3-iodo-2-propynyl ether | 0 | 0 | 0 | 0 | 0 | 50 |
| 4-methoxyphenyl 2-propynyl ether | 0 | 0 | | 17 | | |
| 4-methoxyphenyl 3-iodo-2-propynyl ether | 0 | 0 | | 17 | | |
| 2,3-dichlorophenyl 3-bromo-2-propynyl ether | 0 | 0 | | | 27 | 100 |
| 2,3-dichloro-1-(2-propynylmercapto)benzene | 0 | 0 | | 0 | 13 | |
| 2,3-dichloro-1-(3-iodo-2-propynylmercapto)benzene | 0 | 0 | | 13 | 87 | |
| 3,4-dichloro-1-(2-propynylmercapto)benzene | 0 | 0 | | 0 | 7 | |
| 2,4,5-trichloro-1-(2-propynylmercapto)benzene | 0 | 0 | | 0 | 43 | |
| 4-nitrophenyl 2-propynyl ether | 0 | 0 | 7 | 77 | | |
| 3-nitrophenyl 2-propynyl ether | 0 | 0 | 83 | 100 | | |
| 2-nitrophenyl 3-iodo-2-propynyl ether | 0 | 0 | 70 | 100 | | |
| 2-nitro-4-chlorophenyl 2-propynyl ether | 0 | 0 | 83 | 100 | | |
| 4-chloro-2-nitrophenyl 3-iodo-2-propynyl ether | 0 | 0 | 60 | 100 | | |
| 2,4-dibromophenyl 2-propynyl ether | 0 | 0 | 67 | 100 | 100 | |
| 2,4-dichlorophenyl 2-propynyl ether | 0 | 0 | 20 | 100 | 100 | |
| 2,4-dichloro-1-naphthyl-2-propynyl ether | 0 | 0 | 57 | 100 | 100 | |
| 2-nitrophenyl 2-propynyl ether | 0 | 0 | 3 | 73 | 97 | |
| 3-nitrophenyl 3-iodo-2-propynyl ether | 0 | 0 | 0 | 17 | 100 | |
| Phenyl-3-iodo-2-propynyl ether | 0 | 0 | 0 | 0 | 57 | |
| 3-methyl-6-isopropylphenyl 2-propynyl ether | 0 | 0 | 0 | 0 | 3 | |
| 4-fluorophenyl 3-iodo-2-propynyl ether | 0 | 0 | 0 | 3 | 90 | |
| 2-chlorophenyl 3-iodo-2-propynyl ether | 0 | 0 | 0 | 43 | 100 | |
| 4-chloro-6-iodo-2-nitrophenyl 2-propynyl ether | 0 | 0 | 17 | 76 | 97 | |
| 4-chloro-6-iodo-2-nitrophenyl 3-iodo-2-propynyl ether | 0 | 0 | 3 | 6 | 40 | |
| 2,3-dibromophenyl 2-propynyl ether | 0 | 0 | 13 | 97 | 100 | |

Table III illustrates the synergistic effect of a number of representative insecticidal carbamates in combination with a representative propargylaryl ether.

Tables IV and V illustrate the insecticidal activity of a number of propargylaryl ethers combined with a representative insecticidal carbamate at various ratios of carbamate to propargylaryl ether. The carbamate:ether ratio is varied between two parts of carbamate per part of ether and one part of carbamate to five parts of ether.

Tables VI, VII and VIII illustrate the synergistic effect of the compounds of this invention when applied in insecticidal amounts to representative species of Diptera, Lepidoptera and Coleoptera.

Table IX illustrates the insecticidal activity of a representative synergistic composition against the fruit fly. In this test an insecticidal carbamate and/or propargylaryl ether in specified amounts in 1.0 ml. of acetone was used to saturate a filter paper of 9 cm. diameter which was dried and then placed in a covered petri dish. Ten 5-day old female fruit flies (60 flies per replicate) were then placed on the treated filter paper and left for one-half, one, or two hours, respectively (contact time). After contact with the treated filter paper, the flies were transferred to a clean petri dish where they were held for a 24-hour period after which the number of dead flies was counted. In both dishes the flies had free access to a square of untreated nutrient media. The results are expressed as the percent of flies killed for the various synergistic compositions at each of the three contact times.

TABLE III.—INSECTICIDAL ACTIVITY OF VARIOUS CARBAMATE-PROPARGYLARYL ETHER COMBINATIONS

| Mcg./fly | | Percent Kill |
|---|---|---|
| 1-isopropyl-3-methyl-5-pyrazolyl dimethyl carbamate | 2,3,6-trichlorophenyl 2-propynyl ether | |
| 1.0 | ---------- | 17 |
| 2.0 | ---------- | 30 |
| 4.0 | ---------- | 80 |
| 8.0 | ---------- | 100 |
| 0.04 | 0.2 | 10 |
| 0.06 | 0.3 | 50 |
| 0.08 | 0.4 | 87 |
| 0.1 | 0.5 | 100 |
| ---------- | 10.0 | 0 |
| 4-dimethylamino-3,5-xylylmethyl carbamate | 2,3,6-trichlorophenyl 2-propynyl ether | |
| 0.4 | ---------- | 20 |
| 0.8 | ---------- | 73 |
| 1.0 | ---------- | 100 |
| 0.1 | 0.5 | 13 |
| 0.2 | 1.0 | 77 |
| 0.4 | 2.0 | 100 |
| ---------- | 10.0 | 0 |
| Dimethylcarbamate of (3-hydroxyphenyl)dimethylamine hydrochloride | 2,3,6-trichlorophenyl 3-iodo-2-propynyl ether | |
| 10.0 | ---------- | 10 |
| 1.0 | 5.0 | 87 |
| ---------- | 10.0 | 0 |

TABLE IV

[Synergist ratio test, topical application to the house fly ($x$ mcg. of 1-naphthyl-N-methyl carbamate and $y$ mcg. of propargylaryl ether)]

| Propargylaryl ether | Percent Kill (24 hr.) | | | |
|---|---|---|---|---|
| | $x=0.2$, $y=0.1$ | $x=0.2$, $y=0.2$ | $x=0.2$, $y=0.4$ | $x=0.2$, $y=1.0$ |
| 2,3,6-trichlorophenyl 2-propynyl ether | 12 | 38 | 77 | 84 |
| 2,3,6-trichlorophenyl 3-iodo-2-propynyl ether | 3 | 13 | 68 | 90 |
| 2-nitrophenyl 3-iodo-2-propynyl ether | 10 | 20 | 53 | 70 |
| 2-nitro-4-chlorophenyl 2-propynyl ether | 0 | 13 | 30 | 83 |
| 3-nitrophenyl 2-propynyl ether | 0 | 7 | 13 | 83 |
| 2,4,5-trichlorophenyl 2-propynyl ether | 0 | 0 | 10 | 47 |
| 2,3,4-trichlorophenyl 2-propynyl ether | 0 | 23 | 27 | 91 |
| 3,4,5-trichlorophenyl 2-propynyl ether | 3 | 16 | 23 | 88 |

TABLE V

[Synergist ratio test, topical application to the house fly ($x$ mcg. of 1-naphthyl-N-methyl carbamate and $y$ mcg. of propargylaryl ether)]

| Propargylaryl ether | Percent Kill (24 hr.) | | | |
|---|---|---|---|---|
| | $x=0.4$, $y=0.2$ | $x=0.4$, $y=0.4$ | $x=0.4$, $y=0.8$ | $x=0.4$, $y=2.0$ |
| 2-nitrophenyl 3-iodo-2-propynyl ether | 77 | 70 | 100 | 100 |
| 2,3,6-trichlorophenyl 2-propynyl ether | 75 | 93 | 97 | 100 |
| 2-nitro-4-chlorophenyl 2-propynyl ether | 47 | 67 | 80 | 100 |
| 2,4,5-trichlorophenyl 2-propynyl ether | 17 | 43 | 83 | 100 |
| 2,3,4-trichlorophenyl 2-propynyl ether | 37 | 56 | 97 | 100 |
| 3,4,5-trichlorophenyl 2-propynyl ether | 16 | 70 | 93 | 100 |
| 2,3,6-trichlorophenyl 3-iodo-2-propynyl ether | 40 | 90 | 97 | 100 |
| 3-nitrophenyl 2-propynyl ether | 20 | 87 | 100 | 100 |

TABLE VI.—ALFALFA WEEVIL, *HYPERA POSTICA*

[Topical application to larvae (mcg./larva) 30 larvae (last instar) per replicate]

| Carbamate | Dose | Propargylaryl | Dose | Percent Kill (72 hr.) |
|---|---|---|---|---|
| 1-naphthyl-N-methyl carbamate. | 2.0 | ---------- | ---------- | 7 |
| Do | 5.0 | ---------- | ---------- | 27 |
| Do | 0.2 | 2,4,5-trichlorophenyl 2-propynyl ether. | 1.0 | 3 |
| Do | 0.4 | ----do---- | 2.0 | 60 |
| Do | 0.8 | ----do---- | 4.0 | 97 |
| Do | 1.0 | ----do---- | 5.0 | 97 |
| ---------- | ---------- | ----do---- | 10.0 | 3 |
| ---------- | ---------- | ---------- | ---------- | (control) 0 |

TABLE VII.—FLOUR BEETLE, *TRIBOLIUM CONFUSUM*

[Feeding test (flour and glucose tablet). Dosage in mg. per 500 mg. tablet. Two tablets per jar of 30 beetles. Two replicate jars for each concentration. Experiment repeated 3 times with similar results]

| Carbamate | Dose | Propargylaryl ether | Dose | Percent Kill (8 days) |
|---|---|---|---|---|
| 1-naphthyl-N-methyl carbamate. | 0.5 | ---------- | ---------- | 7 |
| Do | 5.0 | ---------- | ---------- | 60 |
| Do | 0.5 | 2,4,5-trichlorophenyl 2-propynyl ether. | 2.5 | 97 |
| ---------- | ---------- | ----do---- | 5.0 | 17 |
| ---------- | ---------- | ---------- | ---------- | (control) 0 |

TABLE VIII.—CABBAGE LOOPER, *TRICHOPLUSIA NI*

[Topical application to larvae (mcg/larva) 30 larvae (4th to 5th instar) per replicate]

| Carbamate | Dose | Propargylaryl ether | Dose | Percent Kill (40 hrs). |
|---|---|---|---|---|
| 1-isopropyl-3-methyl-5-pyrazolyl dimethyl carbamate. | 0.5 | 2,4,5-trichlorophenyl 2-propynyl ether. | 2.5 | 0 |
| Do | 1.0 | ----do---- | 5.0 | 0 |
| Do | 2.0 | ----do---- | 10.0 | 65 |
| Do | 4.0 | ---------- | ---------- | 10 |
| ---------- | ---------- | 2,4,5-trichlorophenyl 2-propynyl ether | 10.0 | 5 |
| ---------- | ---------- | ----do---- | ---------- | (control) 0 |

TABLE IX
[Effect of synergistic combination of 1-naphthyl N-methyl carbamate and 2,4,5-trichlorophenyl 2-propynyl ether on the fruit fly (*Drosophila melanogaster*)]

| Mg. Toxicant* | | Percent Kill at 24 hrs. | | |
|---|---|---|---|---|
| 1-naphthyl N-methyl carbamate | 2,4,5-trichlorophenyl 2-propynyl ether | Contact Time, 30 min. | Contact Time, 60 min. | Contact Time, 120 min. |
| 0.4 | 2.0 | 2 | 3 | 35 |
| 0.8 | 4.0 | 18 | 23 | 75 |
| 1.6 | 8.0 | 13 | 58 | 93 |
| 2.0 | 10.0 | 33 | 93 | 100 |
| 10.0 | ---- | ---- | 2 | 2 |
| ---- | 10.0 | ---- | 2 | 0 |

*Per 9 cm. filter paper.

Generic Formula I encompasses a host of compounds which are per se novel. Such novel compounds and the preparative methods described herein do not constitute a part of this invention and are given here for the sake of completeness only. The propargylaryl ethers suitable for use in the synergistic combinations of this invention are prepared by condensing the appropriate aromatic alcohol with halopropyne to form the terminal acetylenic compounds and where the terminal halo compounds are desired, they are prepared by subsequently halogenating the terminal acetylenic carbon. The propargylaryl thioethers suitable for use in the synergistic combinations of this invention are prepared by condensing the appropriate aromatic thiol with mono or dihalopropyne.

The examples which follow constitute exemplars of the preparative methods employed in the preparation of the propargylaryl ethers and propargylaryl thioethers, respectively.

*Example 1.—Preparation of 2,3,4-trichlorophenyl 2-propynyl ether*

To a 250 ml. 3-neck round bottom flask equipped with a stirrer and reflux condenser were charged 13.5 g. (0.068 mole) of 2,3,4-trichlorophenol, 8.9 g. (0.075 mole) of 3-bromopropyne, 10.4 g. (0.75 mole) of potassium carbonate and 125 ml. of acetone. After the reaction was stirred and refluxed for 8 hours, the solids were filtered and the filtrate was evaporated in vacuo at 60°. The residue was recrystallized from 100 cc. of ethanol and dried in a vacuum oven at 60° to yield 2,3,4-trichlorophenyl 2-propynyl ether, M.P. 78–80°.

By analogous procedure there were also prepared the following compounds: 2,3,6-trichlorophenyl 2-propynyl ether, M.P. 63–65°—2,3,4-trichlorophenyl 2-propynyl ether, M.P. 78–80°—3,4,5-trichlorophenyl 2-propynyl ether, M.P. 64–65°—2,4,5-trichlorophenyl 2-propynyl ether, M.P. 63–64°—2,4,6-trichlorophenyl 2-propynyl ether, M.P. 99–100°—2,3,5-trichlorophenyl 2-propynyl ether, M.P. 62°—2,3-dichlorophenyl 2-propynyl ether, M.P. 47–49°—4-methoxyphenyl 2-propynyl ether, B.P. 118–120°/7 mm.—4-nitrophenyl 2-propynyl ether, M.P. 114–116°—3-nitrophenyl 2-propynyl ether, M.P. 67–69°—2-nitro-4-chlorophenyl 2-propynyl ether, M.P. 82–84°—2,4-dibromophenyl 2-propynyl ether, M.P. 67.2–67.8°—2,4-dichloro-1-naphthyl-2-propynyl ether, M.P. 100–100.8°—2-nitrophenyl 2-propynyl ether, M.P. 74–76°—3-methyl-6-isopropylphenyl 2-propynyl ether, B.P. 69°/0.04 mm.—4-chloro-6-iodo-2-nitrophenyl 2-propynyl ether, M.P. 91–93°—2,3-dibromophenyl 2-propynyl ether, M.P. 49–50°, phenyl 2-propynyl ether, B.P. 92°/25 mm.

*Example 2.—Preparation of 2,3,6-trichlorophenyl 2-propynyl ether and 2,3,6-trichlorophenyl 3-iodo-2-propynyl ether*

To a 250 ml. 3-neck round bottom flask equipped with a stirrer and reflux condenser were charged 19.8 g. (0.1 mole) 2,3,6-trichlorophenol, 13.1 g. (0.11 mole) of 3-bromopropyne, 15.2 g. (0.11 mole) of potassium carbonate and 150 ml. of acetone. After the reaction was stirred and refluxed for 8 hours, the solids were filtered and the filtrate was evaporated in vacuo at 60°. The residue was recrystallized from 100 cc. of ethanol and dried in a vacuum oven at 50° to yield 2,3,6-trichlorophenyl 2-propynyl ether, M.P. 63–65.

To a 500 ml. 3-neck round bottom flask equipped with a stirrer, a dropping funnel and a thermometer were charged 8.5 g. (0.036 mole) of 2,3,6-trichlorophenyl 2-propynyl ether prepared as above and 75 ml. of methanol. To the vigorously stirred solution were added simultaneously 12 g. (0.048 mole) of iodine in small portions and 45 ml. of a 10 percent aqueous sodium hydroxide solution (0.11 mole) dropwise over a period of 15 minutes while the reaction temperature was kept between 20° and 25° by means of an ice-water bath. After stirring for 1 hour longer at room temperature, the mixture was diluted with 100 ml. of water and chilled in an ice-water bath. The crystals which formed were filtered and dried in a vacuum oven at 60° to yield 2,3,6-trichlorophenyl 3-iodo-2-propynyl ether, M.P. 88–89°.

By analogous procedure there were also prepared the following compounds: 2,4,5 - trichlorophenyl 3 - iodo - 2-propynyl ether, M.P. 111–113°—2,3,5-trichlorophenyl 3-iodo-2-propynyl ether, M.P. 98–100°—2,3,4-trichlorophenyl 3-iodo-2-propynyl ether, M.P. 107–110°—3,4,5-trichlorophenyl 3 - iodo - 2 - propynyl ether, M.P. 107–110°—2,4,6 - trichlorophenyl 3 - iodo-2-propynyl ether, M.P. 102°—2,3-dichlorophenyl 3-iodo-2-propynyl ether, M.P. 59–60°—2,5 - dichlorophenyl 3 - iodo-2-propynyl ether, M.P. 86–88°—2,3,4,6-tetrachlorophenyl 3-iodo-2-propynyl ether, M.P. 104–105°—2,3,4,5,6-pentachlorophenyl 3 - iodo - 2 - propynyl ether, M.P. 140–141°—4-methoxyphenyl 3 - iodo - 2 - propynyl ether, M.P. 44–45°—2,3-dichlorophenyl 3-bromo-2-propynyl ether, M.P. 68–69°—2-nitrophenyl 3-iodo-2-propynyl ether, M.P. 96–98°—4 - chloro-2-nitrophenyl 3-iodo-2-propynyl ether, M.P. 116–117°—3-nitrophenyl-3-iodo-2-propynyl ether, M.P. 88–90°—phenyl 3-iodo-2-propynyl ether, B.P. 90°/0.05 mm.—4-fluorophenyl 3-iodo-2-propynyl ether, B.P. 87°/0.075 mm.—2-chlorophenyl 3-iodo-2-propynyl ether, B.P. 97°/0.03 mm.—4 - chloro-6-iodo-2-nitrophenyl 3-iodo-2-propynyl ether, M.P. 115–116°, phenyl 3-iodo-2-propynyl ether, B.P. 90°/0.05 mm.

*Example 3.—Preparation of 2-nitro-4-chloro-1-(2-propynylmercapto) benzene*

To a 500 ml. 3-neck round bottom flask equipped with a stirrer and dropping funnel were charged 20 g. (0.1 mole) of 2-nitro-4-chlorothiophenol and 55 ml. (0.14 mole) of a 10 percent aqueous sodium hydroxide solution. To the stirred solution was added dropwise 13 g. (0.11 mole) of propargyl bromide over a period of 15 minutes keeping the reaction temperature between 25° and 30° C. After stirring 1 hour at room temperature the precipitate was filtered, washed with 200 ml. of water and dried in a vacuum oven at 60° to yield 2-nitro-4-chloro-1-(2-propynylmercapto)benzene, M.P. 134–136° C.

By analogous procedure there were also prepared the following compounds: 2,3 - dichloro-1-(2-propynylmercapto)benzene, M.P. 59–60°.—3,4-dichloro-1-(2-propynylmercapto)benzene, B.P. 98°/0.04 mm.—2,4,5-trichloro-1-(2-propynylmercapto)benzene, M.P. 76–77°.

*Example 4.—Preparation of 2,3-dichloro-1-(3-iodo-2-propynylmercapto)benzene*

To a 500 ml. 3-neck round bottom flask equipped with a stirrer and a dropping funnel were charged 40.5 g. (0.25 mole) of 2,3-dichloroaniline and 100 ml. of 6 N aqueous hydrochloric acid. To the chilled solution (0–5°) was added dropwise, a solution of 18.7 g. (0.27 mole) of sodium nitrite in 40 ml. of water over a period of 30 minutes. After stirring for an additional 30 minutes at 0–5°, the reaction was allowed to warm to 20°. The diazonium salt solution was added dropwise to a solution of 46 g. (0.29 mole) of potassium ethyl xanthate in 100 ml. of water over a period of 30 minutes while maintaining a reaction temperature of 40–50°. After the addition was complete the reaction was heated on a steam bath for 1 hour. The reaction was then chilled in an ice bath and extracted three times with 200 ml. of ether. The ether extracts were washed once with 200 ml. of water, dried over anhydrous sodium sulfate, filtered and evaporated at 40° in vacuo. The residue was dissolved in 150 ml. of hot ethanol and transferred to a 500 ml. 3-neck round bottom flask equipped with a stirrer and a reflux condenser. To the solution was added 80 g. (1.4 moles) of potassium hydroxide in small portions over a period of 15 minutes. After the reaction was refluxed for 10 hours, it was chilled with an ice bath and acidified by adding dropwise 150 ml. of an aqueous solution of hydrochloric acid. The solution was extracted three times with 200 ml. of ether. The ether extracts were combined and washed three times with 100 ml. of water, dried over anhydrous sodium sulfate, filtered and evaporated at 40° in vacuo to yield 2,3-dichlorothiophenol which was used without further purification.

To a 500 ml. 3-neck round bottom flask equipped with a stirrer, a dropping funnel and a thermometer were charged 17.1 g. (0.144 mole) of 3 - bromopropyne and 50 ml. of pure methanol. To the vigorously stirred solution, which was cooled to 15–20°, were added simultaneously 48 g. (0.19 mole) of iodine in small portions and 180 ml. of a 10 percent aqueous sodium hydroxide solution (0.44 mole) dropwise over a period of 15 minutes while the reaction temperature was kept at 20° C. After stirring for 1 hour longer at room temperature the reaction mixture was diluted with 100 ml. of ether and 50 ml. of water. The aqueous layer was separated and extracted three times with 75 ml. porttions of ether. The combined ether extracts were washed once with 100 ml. of water, dried over anhydrous sodium sulfate and evaporated to yield 1 - iodo - 3 - bromopropyne.

To a 250 ml. 3-neck round bottom flask equipped with a stirrer and a reflux condenser were charged 8.9 g. (0.05 mole) of 2,3 - dichlorothiophenol, prepared as above, 14.7 g. (0.06 mole) of 1 - iodo - 3 - bromopropyne, prepared as above, 8.3 g. (0.06 mole) of potassium carbonate and 150 ml. of acetone. After the reaction mixture was stirred and refluxed for 8 hours, the solids were filtered and the filtrate was evaporated in vacuo at 60°. The residue was taken up in 250 ml. of petroleum ether (30–60°) and chromatographed on 150 g. of silica gel. After taking a total of 1 liter of petroleum ether (30–60°) elulates which were discarded, the column was eluted with eight 200 ml. portions of a mixture of benzene (1)—petroleum ether (10) which was pooled and evaporated. The residue was crystallized from 50 ml. of petroleum ether (30–60°) to give 2,3 - dichloro - 1 - (3-iodo - 2 - propynylmercapto)benzene, M.P. 72–74°.

We claim:

1. An insecticidal composition consisting essentially of effective amounts of each of an insecticidal carbamate selected from the group consisting of a lower alkyl phenyl methyl carbamate, a lower alkoxy phenyl methyl carbamate, amino phenyl methyl carbamate, a di - lower alkyl amino phenyl methyl carbamate, an amino phenyl methyl carbamate in which the phenyl moiety is additionally substituted by one or more lower alkyl groups, a di - lower alkyl amino phenyl methyl carbamate in which the phenyl moiety is additionally substituted by one or more lower alkyl groups, a phenyl methyl carbamate in which the phenyl moiety is substituted by one or more of the following: lower alkyl, thiocyano, alkylthio or halo, a 5,5-dimethyl - 3 - oxo - 1 - cyclohexen - 1 - yl methyl carbamate, 3 - cyclohexenylmethyl N - methyl carbamate, 1-naphthyl - N - methyl carbamate, 2,4 - dichloro - 1-naphthyl methyl carbamate, 1 - isopropyl - 3 - methyl - 5-pyrazolyl dimethyl carbamate, 1 - phenyl 3 - methyl - 5-pyrazolyl dimethyl carbamate and 2 - methylcarbamoyloximino - 1,3 - dithiolane and 1 to 10 parts of a compound of the formula

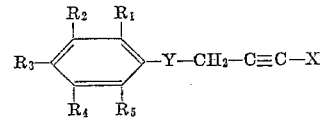

wherein Y represents an oxxygen or a sulfur atom and X represents hydrogen or halogen and each of $R_1$–$R_5$ is either hydrogen, halogen, lower alkyl, lower alkoxy or nitro per part by weight of said carbamate, as the essential insecticides.

2. An insecticidal composition consisting essentially of effective amounts of each of an insecticidal carbamate selected from the group consisting of 2 - isopropoxyphenyl methyl carbamate, 3,5 - dimethyl - 4 - dimethylaminophenyl methyl carbamate, 2 - lower alkyl - 3-(N,N - dialkylamino)phenyl methyl carbamate, 3,5 - dimethyl - 4 - alkylthiophenyl methyl carbamatte, 5,5 - dimethyl - 3 - oxo - 1 - cyclohexen - 1 - yl methyl carbamate, 1 - naphthyl - N - methyl carbamate, 1 - isopropyl - 3 methyl - 5 - pyrazolyl dimethyl carbamate and 1-phenyl 3 - methyl - 5 - pyrazolyl dimethyl carbamate and 1 to 10 parts of a compound of the formula

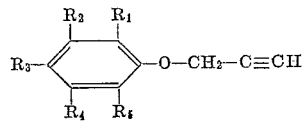

wherein each of $R_1$ to $R_5$ is either hydrogen, halogen, lower alkyl, lower alkoxy or nitro per part by weight of said carbamate, as the essential insecticides.

3. An insecticidal composition consisting essentially of effective amounts of each of an insecticidal carbamate selected from the group consisting of 2 - isopropoxyphenyl methyl carbamate, 3,5 - dimethyl - 4 - dimethylaminophenyl methyl carbamate, 2 - lower alkyl - 3-(N,N - dialkylamino)phenyl methyl carbamate, 3,5 - dimethyl - 4 - alkylthiophenyl methyl carbamate, 5,5 - dimethyl - 3 - oxo - 1 - cyclohexen - 1 - yl methyl carbamate, 1 - naphthyl - N - methyl carbamate, 1 - isopropyl-3 - methyl - 5 - pyrazolyl dimethyl carbamate and 1-phenyl 3 - methyl - 5 - pyrazolyl dimethyl carbamate and 1 to 10 parts of a compound selected from the group consisting of dihalophenyl 2 - propynyl ether, trihalophenyl 2 - propynyl ether and mononitrophenyl 2-propynyl ether per part by weight of said carbamate, as the essential insecticides.

4. An insecticidal composition consisting essentially of effective amounts of each of an insecticidal carbamate selected from the group consisting of 2 - isopropoxyphenyl methyl carbamate, 3,5 - dimethyl - 4 - dimethylaminophenyl methyl carbamate, 2 - lower alkyl - 3-(N,N - dialkylamino)phenyl methyl carbamate, 3,5 - dimethyl - 4 - alkylthiophenyl methyl carbamate, 5,5 - dimethyl - 3 - oxo - 1 - cyclohexen - 1 - yl methyl carbamate, 1 - naphthyl - N - methyl carbamate, 1 - isopropyl- 3 - methyl - 5 - pyrazolyl dimethyl carbamate and 1-phenyl 3 - methyl - 5 - pyrazolyl dimethyl carbamate and 1 to 10 parts of trichlorophenyl 2 - propynyl ether per part by weight of said carbamate, as the essential insecticides.

5. An insecticidal composition consisting essentially of effective amounts of each of an insecticidal carbamate selected from the group consisting of 2 - isopropoxyphenyl methyl carbamate, 3,5 - dimethyl - 4 - dimethylaminophenyl methyl carbamate, 2 - lower alkyl - 3 - (N,N - dialkylamino)phenyl methyl carbamate, 3,5 - dimethyl - 4 - alkylthiophenyl methyl carbamate, 5,5 - dimethyl - 3 - oxo - 1 - cyclohexen - 1 - yl methyl carbamate, 1 - naphthyl - N - methyl carbamate, 1 - isopropyl-3 - methyl - 5 - pyrazolyl dimethyl carbamate and 1-phenyl 3 - methyl - 5 - pyrazolyl dimethyl carbamate and 1 to 10 parts of nitrophenyl - 2 - propynyl ether per part by weight of said carbamate, as the essential insecticides.

6. An insecticidal composition consisting essentially of effective amounts of each of an insecticidal carbamate selected from the group consisting of 2 - isopropoxyphenyl methyl carbamate, 3,5 - dimethyl - 4 - dimethylaminophenyl methyl carbamate, 2 - lower alkyl - 3 - (N,N - dialkylamino)phenyl methyl carbamate, 3,5 - dimethyl - 4 - alkylthiophenyl methyl carbamate, 5,5 - dimethyl - 3 - oxo - 1 - cyclohexen - 1 - yl methyl carbamate, 1 - naphthyl - N - methyl carbamate, 1 - isopropyl-3 - methyl - 5 - pyrazolyl dimethyl carbamate and 1-phenyl 3 - methyl - 5 - pyrazolyl dimethyl carbamate and 1 to 10 parts of 2,3,4 - trichlorophenyl 2 - propynyl ether per part by weight of said carbamate, as the essential insecticides.

7. An insecticidal composition consisting essentially of effective amounts of each of an insecticidal carbamate selected from the group consisting of 2 - isopropoxyphenyl methyl carbamate, 3,5 - dimethyl - 4 - dimethylaminophenyl methyl carbamate, 2 - lower alkyl - 3 - (N,N - dialkylamino)phenyl methyl carbamate, 3,5 - dimethyl - 4 - alkylthiophenyl methyl carbamate, 5,5 - dimethyl - 3 - oxo - 1 - cyclohexen - 1 - yl methyl carbamate, 1 - naphthyl - N - methyl carbamate, 1 - isopropyl-3 - methyl - 5 - pyrazolyl dimethyl carbamate and 1-phenyl 3 - methyl - 5 - pyrazolyl dimethyl carbamate and 1 to 10 parts of 2,4 - dichlorophenyl 2 - propynyl ether per part by weight of said carbamate, as the essential insecticides.

8. The method of killing insects which comprises contacting the insects with a lethal amount of an insecticidal composition comprising an insecticidal carbamate, selected from the group consisting of 2 - isopropoxyphenyl methyl carbamate, 3,5 - dimethyl - 4 - dimethylaminophenyl methyl carbamate, 2 - lower alkyl - 3 - (N,N - dialkylamino)phenyl methyl carbamate, 3,5 - dimethyl - 4 - alkylthiophenyl methyl carbamate, 5,5 - dimethyl - 3 - oxo - 1 - cyclohexen - 1 - yl methyl carbamate, 1 - naphthyl - N - methyl carbamate, 1 - isopropyl-3 - methyl - 5 - pyrazolyl dimethyl carbamate and 1-phenyl 3 - methyl - 5 - pyrazolyl dimethyl carbamate and 1 to 10 parts of a compound of the formula

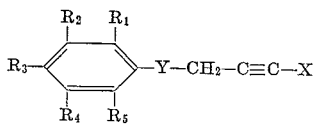

wherein Y represents an oxygen or a sulfur atom and X represents hydrogen or halogen and each of $R_1$–$R_5$ is either hydrogen, halogen, lower alkyl, lower alkoxy or nitro per part by weight of said carbamate.

9. The method of killing insects which comprises contacting the insects with a lethal amount of an insecticidal composition comprising an insecticidal carbamate selected from the group consisting of 2 - isopropoxyphenyl methyl carbamate, 3,5 - dimethyl - 4 - dimethylaminophenyl methyl carbamate, 2 - lower alkyl - 3 - (N,N - dialkylamino)phenyl methyl carbamate, 3,5 - dimethyl - 4 - alkylthiophenyl methyl carbamate, 5,5 - dimethyl - 3 - oxo - 1 - cyclohexen - 1 - yl methyl carbamate, 1 - naphthyl - N - methyl carbamate, 1 - isopropyl-3 - methyl - 5 - pyrazolyl dimethyl carbamate and 1-phenyl 3 - methyl - 5 - pyrazolyl dimethyl carbamate and 1 to 10 parts of a compound of the formula

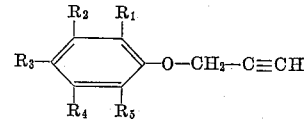

wherein each of $R_1$ to $R_5$ is either hydrogen, halogen, lower alkyl, lower alkoxy or nitro per part by weight of said carbamate.

10. An insecticidal composition consisting essentially of effective amounts of each of a carbamate selected from the group consisting of 2 - isopropoxyphenyl methyl carbamate, 3,5 - dimethyl - 4 - dimethylaminophenyl methyl carbamate, 2 - lower alkyl - 3 - (N,N - dialkylamino)phenyl methyl carbamate, 3,5 - dimethyl - 4-alkylthiophenyl methyl carbamate, 5,5 - dimethyl - 3-oxo - 1 - cyclohexen - 1 - yl methyl carbamate, 1 - naphthyl - N - methyl carbamate, 1 - isopropyl - 3 - methyl-5 - pyrazolyl dimethyl carbamate and 1 - phenyl 3 - methyl - 5 - pyrazolyl dimethylcarbamate and 1 to 10 parts of a compound of the formula

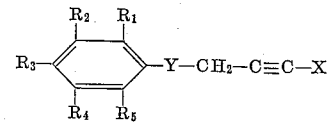

wherein Y represents an oxygen or a sulfur atom and X represents hydrogen or halogen and each of $R_1$–$R_5$ is either hydrogen, halogen, lower alkyl, lower alkoxy or nitro per part by weight of said carbamate, as the essential insecticides.

11. An insecticidal composition consisting essentially of effective amounts of each of a carbamate selected from the group consisting of 2 - isopropoxyphenyl methyl carbamate, 3,5 - dimethyl - 4 - dimethylaminophenyl methyl carbamate, 2 - lower alkyl - 3 - (N,N - dialkylamino)phenyl methyl carbamate, 3,5 - dimethyl - 4-alkylthiophenyl methyl carbamate, 5,5 - dimethyl - 3-oxo - 1 - cyclohexen - 1 - yl methyl carbamate, 1 - naphthyl - N - methyl carbamate, 1 - isopropyl - 3 - methyl-5 - pyrazolyl dimethyl carbamate and 1 - phenyl 3 - methyl - 5 - pyrazolyl dimethyl carbamate and 1 to 10 parts of a compound of the formula

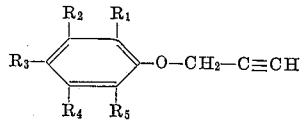

wherein each of $R_1$ to $R_5$ is either hydrogen, halogen, lower alkyl, lower alkoxy or nitro per part by weight of said carbamate, as the essential insecticides.

12. An insecticidal composition consisting essentially of effective amounts of each of a carbamate selected from the group consisting of 2 - isopropoxyphenyl methyl carbamate, 3,5 - dimethyl - 4 - dimethylaminophenyl methyl carbamate, 2 - lower alkyl - 3 - (N,N - dialkylamino)phenyl methyl carbamate, 3,5 - dimethyl - 4-alkylthiophenyl methyl carbamate, 5,5 - dimethyl - 3-oxo - 1 - cyclohexen - 1 - yl methyl carbamate, 1 - naphthyl - N - methyl carbamate, 1 - isopropyl - 3 - methyl-5 - pyrazolyl dimethyl carbamate and 1 - phenyl 3 - methyl - 5 - pyrazolyl dimethyl carbamate and 1 to 10 parts of a compound selected from the group consisting of 2,3,6 - trichlorophenyl 2 - propynyl ether, 2,3,6 - trichlorophenyl 3 - iodo - 2 - propynyl ether, 2,3,4 - trichlorophenyl 2 - propynyl ether, 2,4,5 - trichlorophenyl 3 - iodo - 2 - propynyl ether, 3,4,5 - trichlorophenyl 2 - propynyl ether, 2,4,5 - trichlorophenyl 2 - propynyl ether, 2,3,5 - trichlorophenyl 3 - iodo - 2 - propynyl ether, 2,3,4 - trichlorophenyl 3 - iodo - 2 - propynyl ether, 3,4,5 - trichlorophenyl 3 - iodo - 2 - propynyl ether, 2,3,5 - trichlorophenyl 2 - propynyl ether, 2,4 - dichlorophenyl 2 - propynyl ether, 2,3 - dichlorophenyl 3 - iodo - 2 - propynyl ether, 2,3,4,6 - tetrachlorophenyl 3 - iodo - 2 - propynyl ether, 3 - nitrophenyl 2 - propynyl ether, 2 - nitrophenyl 3 - iodo - 2 - propynyl ether, 2 - nitro - 4 - chlorophenyl 2 - propynyl ether, 4 - chloro - 2-nitrophenyl 3 - iodo- 2 - propynyl ether, 2,4 - dibromophenyl 2 - propynyl ether, 2,4 - dichloro - 1 - naphthyl - 2 - propynyl ether, 3 - nitrophenyl 3 - iodo - 2 - propynyl ether, 2 - chlorophenyl 3 - iodo - 2 - propynyl ether, 2,3 - dibromophenyl 2 - propynyl ether, and phenyl 3 - iodo - 2 - propynyl ether, as the essential insecticides.

13. An insecticidal composition consisting essentially of effective amounts of each of carbamates selected from the group consisting of 1 - naphthyl - N - methyl carbamate, 3,5 - dimethyl - 4 - dimethylaminophenyl methyl carbamate and 1 - isopropyl - 3 - methyl - 5 - pyrazolyl dimethyl carbamate and 1 to 10 parts of a compound selected from the group consisting of dihalophenyl 2-propynyl ether, trihalophenyl 2 - propynyl ether and mononitrophenyl 2 - propynyl ether per part by weight of said carbamate, as the essential insecticides.

14. An insecticidal composition consisting essentially of effective amounts of each of carbamates selected from the group consisting of 1 - naphthyl - N - methyl carbamate, 3,5 - dimethyl - 4 - dimethylaminophenyl methyl carbamate and 1 - isopropyl - 3 - methyl - 5 - pyrazolyl dimethyl carbamate and 1 to 10 parts of a compound selected from the group consisting of dihalophenyl 2-propynyl ether and trihalophenyl 2 - propynyl ether per part by weight of said carbamate, as the essential insecticides.

15. An insecticidal composition consisting essentially of effective amounts of each of carbamates selected from the group consisting of 1 - naphthyl - N - methyl carbamate, 3,5 - dimethyl - 4 - dimethylaminophenyl methyl carbamate and 1 - isopropyl - 3 - methyl - 5 - pyrazolyl dimethyl carbamate and 1 to 10 parts of nitrophenyl 2-propynyl ether per part by weight of said carbamate, as the essential insecticides.

16. An insecticidal composition consisting essentially of effective amounts of each of 1 - naphthyl - N - methyl carbamate and 1 to 10 parts of a compound selected from the group consisting of dihalophenyl 2 - propynyl ether, trihalophenyl 2 - propynyl ether and mononitrophenyl 2-propynyl ether per part by weight of said carbamate, as the essential insecticides.

17. An insecticidal composition consisting essentially of effective amounts of each of 1 - naphthyl - N - methyl carbamate and 1 to 10 parts of a compound selected from the group consising of dihalophenyl 2 - propynyl ether and trihalophenyl 2 - propynyl ether per part by weight of said carbamate, as the essential insecticides.

18. An insecticidal composition consisting essentially of effective amounts of each of 1 - naphthyl - N - methyl carbamate and 1 to 10 parts of nitrophenyl 2 - propynyl ether per part by weight of said carbamate, as the essential insecticides.

19. An insecticidal composition consisting essentially of effective amounts of each of 1 - naphthyl - N - methyl carbamate and 1 to 10 parts of 2,3,4 - trichlorophenyl 2 - propynyl ether per part by weight of said carbamate, as the essential insecticides.

20. An insecticidal composition consisting essentially of effective amounts of each of 1 - naphthyl - N - methyl carbamate and 0.5 to 10 parts of 2,3,6 - trichlorophenyl 2 - propynyl ether per part by weight of said carbamate, as the essential insecticides.

21. An insecticidal composition consisting essentially of effective amounts of each of 1 - naphthyl - N - methyl carbamate and 1 to 10 parts of 2,4 - dihalophenyl 2 - propynyl ether per part by weight of said carbamate, as the essential insecticides.

22. An insecticidal composition consisting essentially of effective amounts of each of 1 - naphthyl - N - methyl carbamate and 1 to 10 parts of 2,3,6 - trichlorophenyl 3 - iodo - 2 - propynyl ether per part by weight of said carbamate, as the essential insecticides.

23. An insecticidal composition consisting essentially of effective amounts of each of 1 - naphthyl - N - methyl carbamate and 1 to 10 parts of 3 - nitrophenyl 2 - propynyl ether per part by weight of said carbamate, as the essential insecticides.

24. An insecticidal composition consisting essentially of effective amounts of each of 1 - naphthyl - N - methyl carbamate and 0.5 to 10 parts of 2 - nitrophenyl 3 - iodo- 2 - propynyl ether per part by weight of said carbamate, as the essential insecticides.

25. An insecticidal composition consisting essentially of effective amounts of each of 1 - naphthyl - N - methyl carbamate and 1 to 10 parts of 2 - nitro - 4 - chlorophenyl 2 - propynyl ether per part by weight of said carbamate, as the essential insecticides.

26. An insecticidal composition consisting essentially of effective amounts of each of 1 - naphthyl - N - methyl carbamate and 1 to 10 parts of 4 - chloro - 2 - nitrophenyl 3 - iodo - 2 - propynyl ether per part by weight of said carbamate, as the essential insecticides.

27. An insecticidal composition consisting essentially of effective amounts of each of 1 - isopropyl - 3 - methyl- 5 - pyrazolyl dimethyl carbamate and 1 to 10 parts of 2 - nitro - 4 - chlorophenyl 2 - propynyl ether per part by weight of said carbamate, as the essential insecticides.

References Cited

UNITED STATES PATENTS

| | | | |
|---|---|---|---|
| 2,993,934 | 7/1961 | Rosen | 260—612 |
| 3,009,855 | 11/1961 | Lambrech | 167—32 |
| 3,322,813 | 5/1967 | Seki et al. | 260—612 XR |

LEWIS GOTTS, *Primary Examiner.*

S. K. ROSE, *Assistant Examiner.*